Aug. 23, 1960

H. W. WOODWARD 2,949,639

PROCESS FOR SHAPING SHEET PLASTIC MATERIAL

Filed May 17, 1955

INVENTOR
*Hiram W. Woodward*

BY *Burns, Doane, Benedict + Lyons*

ATTORNEYS

Aug. 23, 1960 H. W. WOODWARD 2,949,639
PROCESS FOR SHAPING SHEET PLASTIC MATERIAL
Filed May 17, 1955 3 Sheets-Sheet 2

INVENTOR
*Hiram W. Woodward*

BY *Burns, Doane, Benedict + Irons*
ATTORNEYS

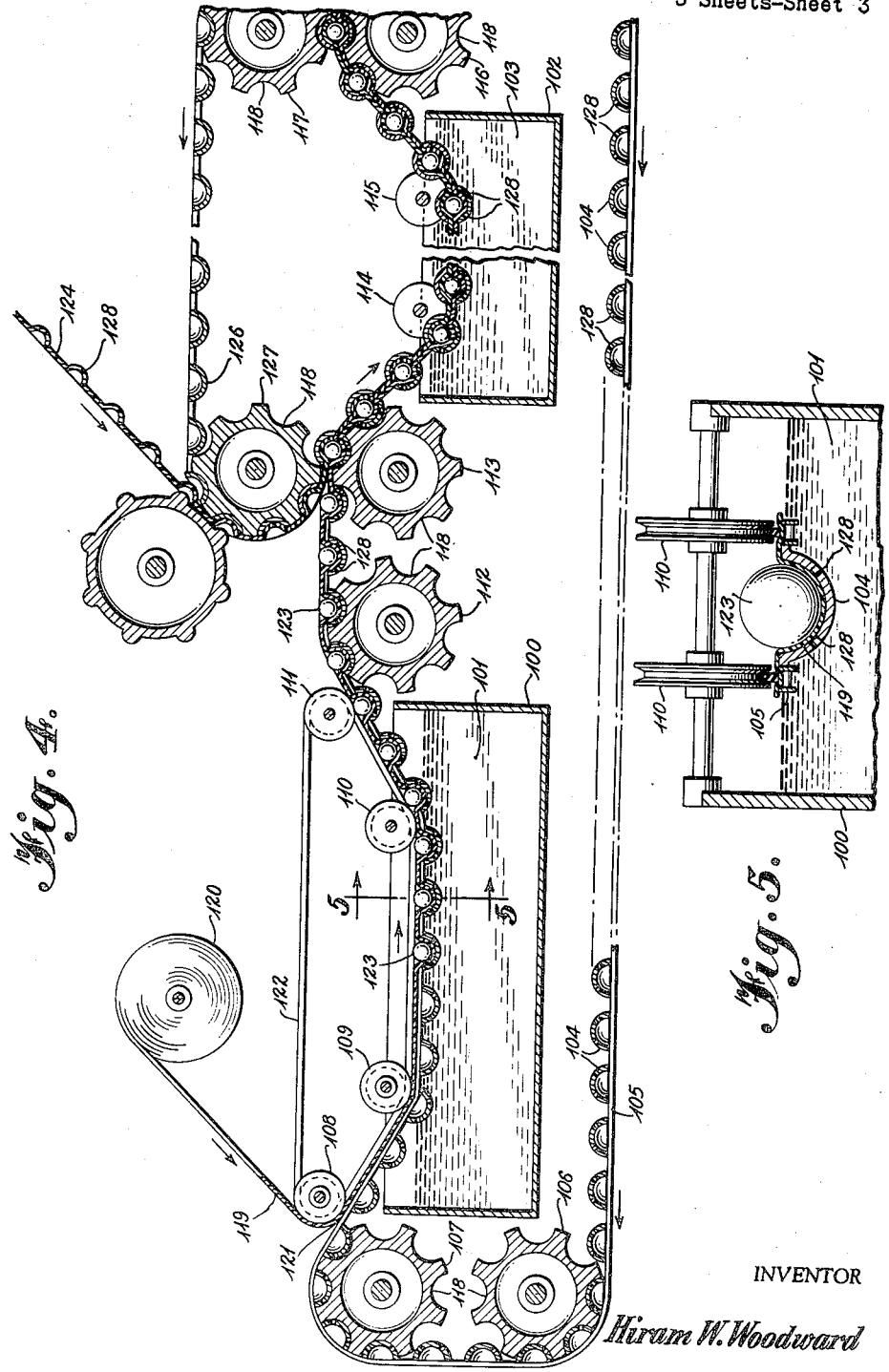

United States Patent Office 2,949,639
Patented Aug. 23, 1960

2,949,639
PROCESS FOR SHAPING SHEET PLASTIC MATERIAL

Hiram W. Woodward, R.D. 2, Owings Mills, Md.

Filed May 17, 1955, Ser. No. 508,964

1 Claim. (Cl. 18—56)

This invention relates to the production of containers including bottles, the forming of molded plastic items, and to the packaging of commodities through utilization of plastic sheet film material. More particularly, the invention embraes a method for the economical commercial production of containers from plastic film, and in one embodiment for the forming of such containers around the product to be packaged.

It is known in the prior art to package a commodity between continuous, parallel layers of plastic sheet material followed by severing the packages so formed into individual units. These prior art packaging methods have limitations however of such a nature that their commercial use is relatively limited. This fact is evident from the hundreds of millions of bags, pouches, similar containers which are annually made from plastic sheet material. The costs incurred from first making the bags, then packing and shipping them to user, next opening, filling and sealing, or closing by other methods are great, and it is because of the limitations of the present methods that the more costly procedure of placing a product in a package rather than forming a package around a product continues in wide use. The present invention removes many of the existing limitations and affords a simple, commercially feasible container for the rapid continuous packaging of articles through utilization of plastic sheet material.

It is a primary object of the invention to provide a novel method whereby long lengths, such as rolls, of thermoplastic sheet material are continuously fabricated into packages or other desired shapes or containers, the requisite molding of such plastic sheet material being effected while said material is in direct heat exchange relationship with a heated liquid medium maintained at a temperature requisite to render the plastic sheet material moldable.

It is a further object of the invention to provide a method for fabricating containers or packages wherein a series of article-receiving cavities is continuously molded into a first sheet of plastic material, said series of cavities is continuously covered with a second sheet of plastic material which may or may not be provided with complementary article-receiving cavities, and thereafter bonding the two sheets together throughout their periphery to the extent desired. The extent of the bonding depends upon the openings required in the container or package for subsequent filling.

It is yet another object of the invention to provide a method for the continuous fabrication of containers or packages wherein a series of article-receiving cavities are molded in a first sheet of plastic material while said sheet is maintained in direct heat exchange contact with a heated liquid medium, the article to be packaged being employed as a male mold to form such cavities. There are two complimentary though differing facets to this specific object. The first is the packaging of an article which is in itself the product, for example an ear of corn, a head of lettuce or a pickle. The second is the covering of a container of another material which is later to be filled, for example a bottle.

It is an additional object of the invention to provide a method for packaging commodities wherein a series of article-receiving cavities is continuously molded in a first sheet of plastic material while said sheet of plastic material is in heat exchange contact with a liquid medium, filling said cavities with the article to be packaged, and then employing a second sheet of plastic material which may or may not have complementary cavities to continuously cover the cavities formed in said first sheet, and wherein the two sheets are thereafter bonded together throughout the desired portion of the periphery of the cavities formed in the first sheet, the bonding being effected by contacting the joined sheets in either direct or indirect heat exchange relationship with a liquid medium, or by conventional sealing methods. The extent to which the periphery is sealed depends upon the product being packaged, particularly whether or not openings for breathing similar to the ventilation holes in produce bags are required.

It is a specific object of the invention to provide a method for forming containers, such as squeeze bottles, from plastic sheet material, including polyethylene, whereinin a first continuous sheet of such plastic material is continuously molded into a series of bottle sections, a second sheet of plastic material is continuously molded to provide a series of complementary bottle sections, and the two sheets are thereafter combined in a manner such that the complementary bottle sections in each sheet are matched and the so combined sheets are then heat bonded at least adjacent the periphery of said complementary bottle sections. In making relatively small containers for subsequent filling the molding of two complementary halves is usually sufficient. For larger containers a plurality of sections, for example quarters, eighths, may be more advantageously employed. In certain instances where comparatively heavy side walls are desired a plurality of sections, with the outer contours of the inner sections matching the inner contours of the outer sections, may be used with the entire group heat bonded after mating.

It is a specific object of the invention to provide a method wherein conventional bottles, such as glass bottles, are coated with a plastic sheet material.

It is a particularly important object of the invention to provide a method for the continuous packaging of various types of foods, such as lettuce, citrus fruits, meats, cheeses, and the like.

A further important object of the invention is to provide a means of rapidly molding plastic items by the method herein described for use in the arts, commerce and industry. The low costs and speed made possible will overcome many of the disadvantages of present methods employed in the vacuum and pressure molding plastic sheets and make available a relatively simple and flexible method of forming a multiplicity of articles and components for subsequent assembly.

The method of the invention comprises providing a continuous sheet of plastic material, advancing said sheet while in direct heat exchange relationship with a liquid medium maintained at a temperature requisite to render said material moldable, continuously molding a series of article-receiving cavities along the length of said sheet, said molding being effected while said material is in direct heat exchange relationship with said liquid medium and after the temperature of said material has been raised to a degree such that said material is moldable, continuously positioning a series of plastic resinous covers over said series of article-receiving cavities, and bonding said covers to said sheet material adjacent said cavities by heat and/or other conventional methods.

In one embodiment of the invention an article to be packaged is inserted into the cavities formed in the sheet of plastic material before such cavities are covered.

In a more specific embodiment of the invention the cavities which are formed in the first continuous sheet are continuously covered by a second sheet of plastic material which may or may not be provided with complementary cavities, whereby a series of interconnected packages or containers is produced which may ultimately be severed to provide individual units. It should be particularly noted that for obtaining heat transfer sufficient to raise the film to molding temperature direct contact with the film is required on only one surface. This surface may be the lower, upper or side depending upon the product, the film, the process, space limitation, etc. Sometimes both surfaces may be in contact though, as noted, this is not required and in instances may be disadvantageous as contact with the liquid often affects the sealability of the film.

It should also be noted that in sealing the heat transfer may be through the meeting surfaces of the male and female molds.

Pursuant to the invention, the article to be packaged or covered may be employed as a male mold to form the necessary receptive cavities in the first continuous sheet of plastic material. For example, the invention finds particular utility in the coating or covering of conventional bottles, such as glass bottles, with plastic resinous material, including polyethylene. Pursuant to this embodiment of the invention, a continuous sheet of plastic resinous material is continuously advanced with at least one surface thereof in direct heat exchange contact with a liquid medium maintained at a temperature requisite to render said material moldable. Bottles to be covered with said material are employed as male molds to form a series of cavities containing said bottles along the length of said sheet, thereafter said bottles are covered with a similar sheet previously molded in an analogous manner to provide a complementary series of complementary cavities of a shape appropriate to cover said bottles, and the two sheets then joined together by heat bonding around the periphery of said cavities whereby a bottle covered by polyethylene or similar resinous material is produced.

It will be appreciated that in many applications, it will not be necessary for the second sheet of thermoplastic material to be provided with an article-receiving cavity. For example, it may be appropriate to provide a cavity of suitable depth in the first sheet and use an unmolded flat second sheet as a cover. Likewise, in some embodiments of the invention, it is contemplated to stretch mold the second sheet over an article extending from the first sheet after such article has been placed in the cavity. It will be appreciated that any commodity, including particularly foods, such as vegetables, lettuce, carrots, and the like, glassware, candy, metal articles, liquids, and in fact, all types of commodities can be packaged by the method of the invention.

It is additionally apparent that the invention can be employed for the production of empty containers, such as, for example, polyethylene bottles. In the practice of this embodiment of the invention, a first sheet of thermoplastic resinous material is continuously advanced with at least one surface thereof in direct heat exchange relationship with a liquid medium heated to a temperature requisite to render such thermoplastic material moldable, a male mold corresponding to a first longitudinal section of a bottle, e.g., a bottle half, is employed to form a series of bottle sections progressively along the length of said first sheet, a second sheet of plastic resinous material is molded to provide a complementary series of bottle sections, and the two sheets are joined in a manner such that the complementary bottle sections are matched, and the sheets are then bonded together along the peripheries of the bottle sections by heat and/or other means including cementing or use of solvents to provide a series of interconnected bottles which may be severed to provide separate units.

The method of the invention is illustrated in the schematic drawings which comprise Figures 1, 2, 3, 4, and 5.

Figure 4 is a schematic view in vertical section of a second type of apparatus which may be employed in the practice of the invention, which apparatus effects also a sealing or bonding of the final container or package while said package is in heat exchange contact with a heated liquid medium; and Figure 5 is a vertical section taken on line 5—5 of Figure 4.

Figure 1:
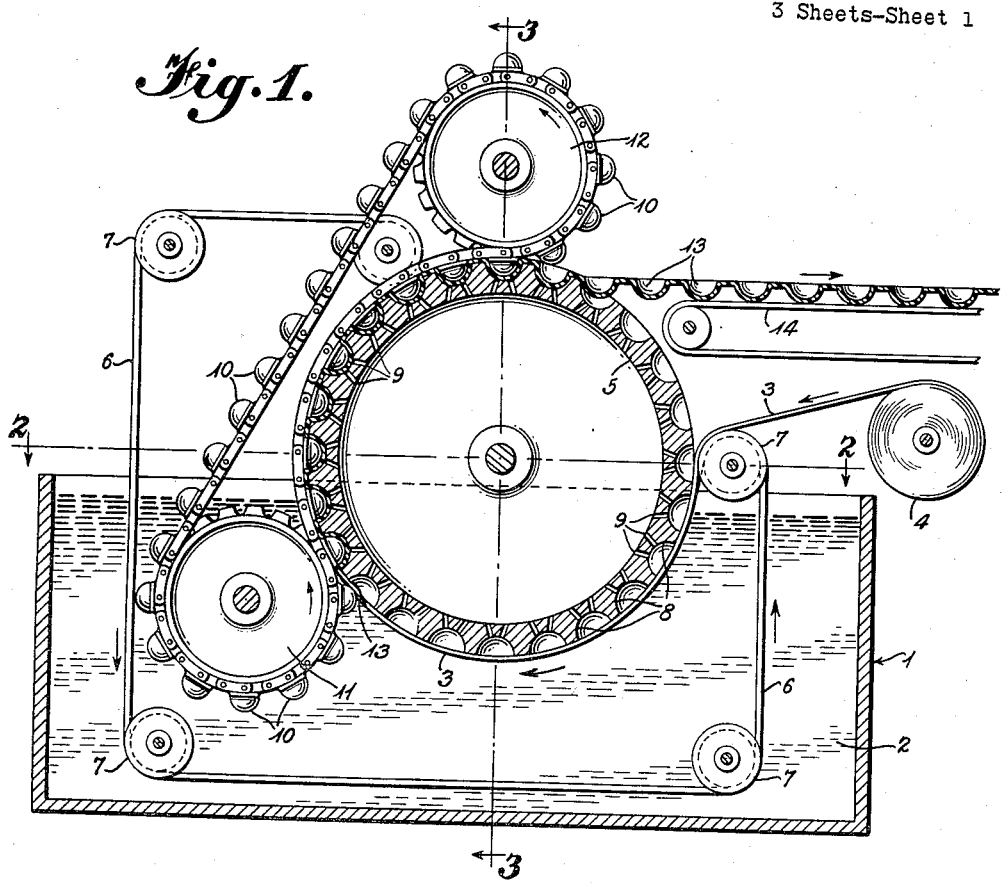
Figure 1 is a schematic view in vertical section of one type of apparatus which can be employed in the practice of the invention.

In Figure 1 there is shown a tank 1 of conventional construction containing a fluid 2, such as ethylene glycol, heated to a temperature requisite to render moldable the sheet of plastic material 3, for example, polyethylene, which is withdrawn from the roll 4. The plastic sheet material is positioned in contact with the female mold wheel 5 by a pair of metal strips or belts 6 which move continuously and at the same speed as the film in the direction indicated by the arrow on the pulleys 7 which are driven by conventional power means not shown. The belts 6 serve to maintain the film in position so that the molding tension is relatively uniform in all directions.

The female mold wheel 5 takes the form of a wheel of comparatively large diameter having a series of female molds 8 formed on the outer periphery thereof. Each mold has one or more openings 9 (Figures 2 and 3) to permit rapid movement of the liquid out of the cavity, when employed to mold the sheet 3 of plastic material.

A series of male molds 10 in the form of a continuous chain is rotated on male mold carrying sprocket wheels 11 and 12 which are synchronously driven in the direction indicated by the arrow by conventional means not shown. As indicated in the drawing, the arrangement is such that the male mold members 10 first engage the complementary female molds 8 carried by the female mold wheel 5 at the point indicated by the numeral 13 in the drawing, while the plastic sheet material 3 is below the surface of the heated liquid medium 2 and in a manner such that the initial molding of the thermoplastic sheet is completed while said sheet is in direct heat exchange contact with such medium. The temperature of the liquid medium 2 and the speed of rotation of the female mold wheel 5 is such that the thermoplastic sheet material is moldable when first contact is made at the point 13 with a male mold member 10.

It is desirable for the molded plastic sheet material to cool from the molding temperature to a set condition before the male and female molds are disengaged. For this reason, the sprocket wheels 11 and 12 are so positioned in relation to the female mold wheel 5 that the male molds 10 remain in engagement with the female molds 8 for a substantial length of time; in the particular apparatus shown in the drawing, until the molded thermoplastic material has passed a point directly above the axis of rotation of the female mold wheel 5. The molded thermoplastic sheet material which has been provided with a series of cavities 13, which may appropriately be employed as article-receiving cavities or container sections, is then discharged from the female mold wheel 5 onto a belt 14 by which it is transported to a station in which the cavities may be, if desired, filled with a commodity to be packaged and thereafter covered with a complementary sheet of plastic material for example, in the manner shown in Figure 4.

Figure 2:
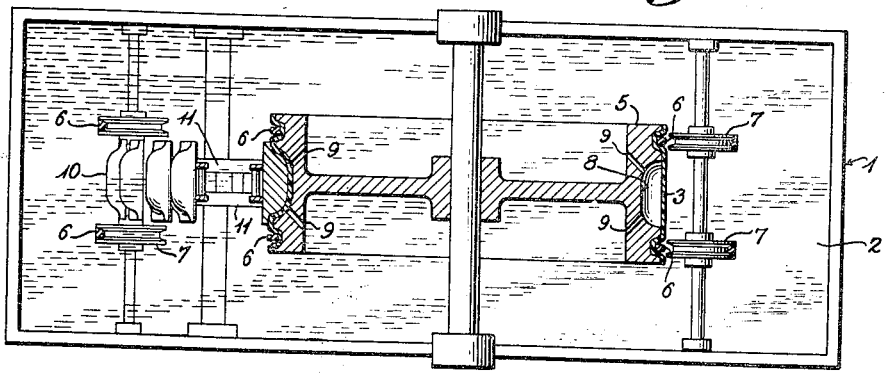
Figure 2 is a horizontal section taken along line 2—2 of Figure 1.
Figure 3:
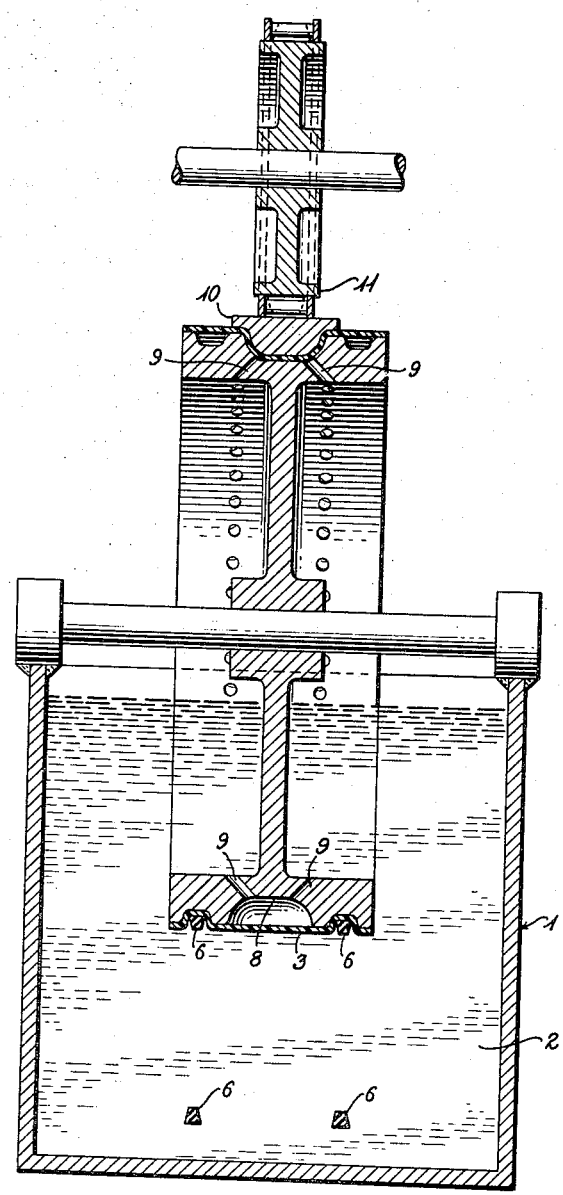
Figure 3 is a vertical section taken along line 3—3 of Figure 1.

It is contemplated by the invention to produce, as by the method described with respect to Figures 1 to 3, molded container sections, such as bottle halves, in two or more sheets of thermoplastic material, which molded sheets may then be joined or mated in appropriate manner to form the complete container and thereafter sealed to provide a series of completed containers interconnected by a web, which web may be severed to provide individual units. More specifically, there may be employed in the apparatus shown in Figures 1 to 3 male and female molds 8 and 10, respectively, which are effective to mold the sheet of thermoplastic material 3 into a bottle half, thus providing a molded sheet in the form of a series of interconnected bottle halves which would correspond to the molded cavities 13 shown in the drawing. Such a molded sheet may be mated with a similarly molded sheet and thereafter bonded along the periphery of the container to provide a series of completed thermoplastic bottles, such as polyethylene bottles, interconnected by a web of thermoplastic material which may be severed to produce the desired individual units.

Likewise, it is contemplated by the invention to partially cover or completely cover articles, such as bottles of thermoplastic material such as polyethylene, by using in one embodiment the article per se as the male mold member and leaving such article in the position in the molded thermoplastic sheet which is thereafter covered with a complementary or matching sheet of thermoplastic material to provide the ultimate covered object, all of which will be more apparent from a consideration of Figures 4 and 5.

Referring to Figure 4, there is shown a first conventional tank 100 containing a heated liquid medium 101, such as mercury or ethylene glycol, and a second conventional tank 102 also filled with a heated liquid medium 103. A series of female molds 104 in the form of an endless chain 105 is arranged for continuous passage in the direction shown by the arrow into and out of the tanks 100 and 102. As shown in the drawings, the female mold chain 105 advances around the sprocket wheels 106 and 107 and is guided into and out of the tank 100 by the combined pulleys and guide wheels 108, 109, 110, and 111. The female mold chain 105 is withdrawn from the tank 100 by the sprocket wheel 12 from which it passes over the sprocket wheel 13 and is introduced into the tank 102 by means of the guide wheel 114. The female mold chain is withdrawn from tank 102 by means of the guide wheel 115 and the cooperating sprocket wheels 116 and 117. It will be observed that each of the wheels 106, 107, 112, 113, 116 and 117 are provided with female mold cavities 118 for receiving the female molds 104 of the female mold chain 105.

A sheet of plastic material 119, such as polyethylene, is continuously withdrawn from the roll 120 and at the point 121 is placed in position for molding with respect to the female mold chain 105. The sheet 119 is maintained in molding position with respect to the female mold chain 105 during the course of the passage of such chain into, through, and out of the tank 100 by means of the guide belts or strips 122 which rotate in the direction shown by the arrow around pulleys 108, 109, 110 and 111. The arrangement is such that the bottom or lower surface only of the sheet 119 is maintained in direct heat exchange contact with the surface of the liquid medium 101 during the course of the passage thereof between the pulley 109 and the pulley 110. The temperature of the liquid medium 101 and the rate of movement of the female mold belt 105 is such that a point intermediate the pulley 109 and the pulley 110 the thermoplastic sheet material will become soft and moldable. At this point, an article to be packaged, such as a head of lettuce 123, is placed in cooperative relationship with respect to one of the female molds 104 and is employed as a mold for the thermoplastic sheet material. After the plastic sheet material has received the article to be packaged, it is withdrawn from the tank 100 with the article maintained therein and passed over the sprocket 112 to sprocket 113. When the thermoplastic sheet material containing the article to be packaged in the cavity which has been molded therein reaches the sprocket 113, it is covered by a complementary sheet of thermoplastic material 124 which has previously been molded, for example, by the method described with reference to Figure 1, to provide a series of complementary sections extending longitudinally therealong.

The arrangement is such that the cavities 125 which have been molded in the sheet of plastic material 124 are positioned over the articles which are carried by the sheet 119 whereby such articles are packaged between the combined molded sheets. There is provided a female mold chain 126 which is rotated about the sprocket 127, which is similar in construction to sprocket 113 and is provided with female mold receiving cavities 118, guide wheels 114 and 115, and the sprocket 117, which is effective to maintain the sheet 124 in proper position with respect to the sheet 119 and the articles 123 contained therein while said sheet is passed downwardly into the liquid 103 which is contained in tank 102. There is provided a male mold wheel for cooperation with the sprocket wheel 127 to position the molded cavities 125 of the sheet 124 in the female mold cavities of the wheel 127. During the course of the passage of the combined sheets downwardly into the heated liquid 103, requisite bonding is effected to complete the packaging of the bottles in the thermoplastic sheet material. As shown in the drawings, the female molds 104 are provided with outlet holes 128 to permit exit of fluid therefrom in the molding step.

It will be appreciated that in the case, for example, of polyethylene and like materials, shrinking is effected in the tank 103 with the result that the article is tightly and securely packaged by the process of the invention.

It should be noted that the web containing the article in Figure 5 is shown as completely immersed in the heated liquid. When it is desired to remove any excess air which may be entrapped, the level must be altered so that a small segment of the article is above the liquid level.

After withdrawal of the web from tank 102, it is severed and trimmed by conventional means and a finished package or container is thereby produced.

When it is necessary or desirable to form a series of cavities or bottle sections with only one side of the film in contact with the heated liquid, the same is readily accomplished by combining with guide belt 122 of Fig. 4 a series of male molds similar to 10 of Fig. 1, and substituting for pulleys 108, 109, 110 and 111 sprockets similar to 11 and 12 of Fig. 1.

In any of the embodiments shown, or in the various possible modifications or combinations thereof, it is desirable at one or more steps in the process to remove the liquid medium which will adhere to the film. This may be done by various conventional methods including air blast, immersion in water with subsequent drying, or by water spray with later drying. For example, if the process of Fig. 1 is employed, removal may be on belt 14. If the process of Fig. 4 is employed in entirety, liquid may be removed subsequent to sprockets 116 and 117. If cavities or bottle sections are formed by the employment of male molds, instead of by the product to be packaged, in schematic device shown in Fig. 4, then removal may be after sprocket 112.

The particular liquid medium, which is employed to effect the heating of the thermoplastic sheet material to moldable condition, is not a critical feature of the invention. Any organic or inorganic medium, liquid under the conditions and which is otherwise suitable, may be employed. More specifically, the choice of the liquid medium to be employed depends large upon the characteristics of the film being used, especially the temperature at which it becomes moldable, and the end use of the container or other molded item. Usually, but not always, the degree of toxicity must be considered. In the development of the invention, depending upon the film employed, a wide range of liquids have been used, extending from tap water slightly below the boiling point up through various temperature ranges including salt solutions, alkylene glycols and polyalkylene glycols such as ethylene glycol, propylene glycol, diethylene glycol, and the like, "Dowtherm," mercury, dibutyl phthalate, etc. Normally, it is desirable to use a medium which has a boiling point reasonably above the temperature at which the film used becomes moldable, although there are conditions under which, for various reasons, it may be desirable to use water under pressure. It will be appreciated that the bonding of the complementary sheets of thermoplastic resinous material need not be effected through the utilization of the liquid medium, as shown in Figure 4, and that such bonding may be effected by other conventional means, including contact with heated metal surfaces, heating in a high frequency electric field, and the like.

The particular thermoplastic sheet material which is employed in the invention does not constitute an essential or critical feature of the invention. All resinous or plastic materials which are heat softenable can be employed. The invention is specifically contemplative of the use of polyethylene, polyethylene terephthalate, polystyrene, and the like.

I claim:

The process which comprises continually advancing a sheet of thermoplastic material with at least one surface thereof in contact with a liquid medium maintained at a temperature requisite to render said material moldable, continuously molding a series of article-receiving cavities along the length of said sheet while said sheet is in direct heat exchange relationship with said medium by bringing complementing male and female mold elements into cooperating molding relationship with the sheet material therebetween while the material is maintained in direct heat exchange relationship with said liquid medium, excluding said medium from said article-receiving cavities during said molding step by closure of said molds, removing said sheet from contact with said heated liquid medium, cooling it to shape retentive temperature, and thereafter separating said molded sheet in the form of a series of interconnected molded cavities from at least one of said mold members.

References Cited in the file of this patent

UNITED STATES PATENTS

| | | |
|---|---|---|
| 2,152,101 | Scherer | Mar. 28, 1939 |
| 2,321,635 | Taylor | June 15, 1943 |
| 2,334,233 | Wood | Nov. 16, 1943 |
| 2,387,747 | Cowley | Oct. 30, 1945 |
| 2,497,212 | Donofrio | Feb. 14, 1950 |
| 2,518,423 | Jenett | Aug. 8, 1950 |
| 2,526,318 | Battin | Oct. 17, 1950 |
| 2,555,369 | Pollitt et al. | June 5, 1951 |
| 2,579,415 | Carson | Dec. 18, 1951 |
| 2,712,208 | Campbell | July 5, 1955 |